Patented July 9, 1929.

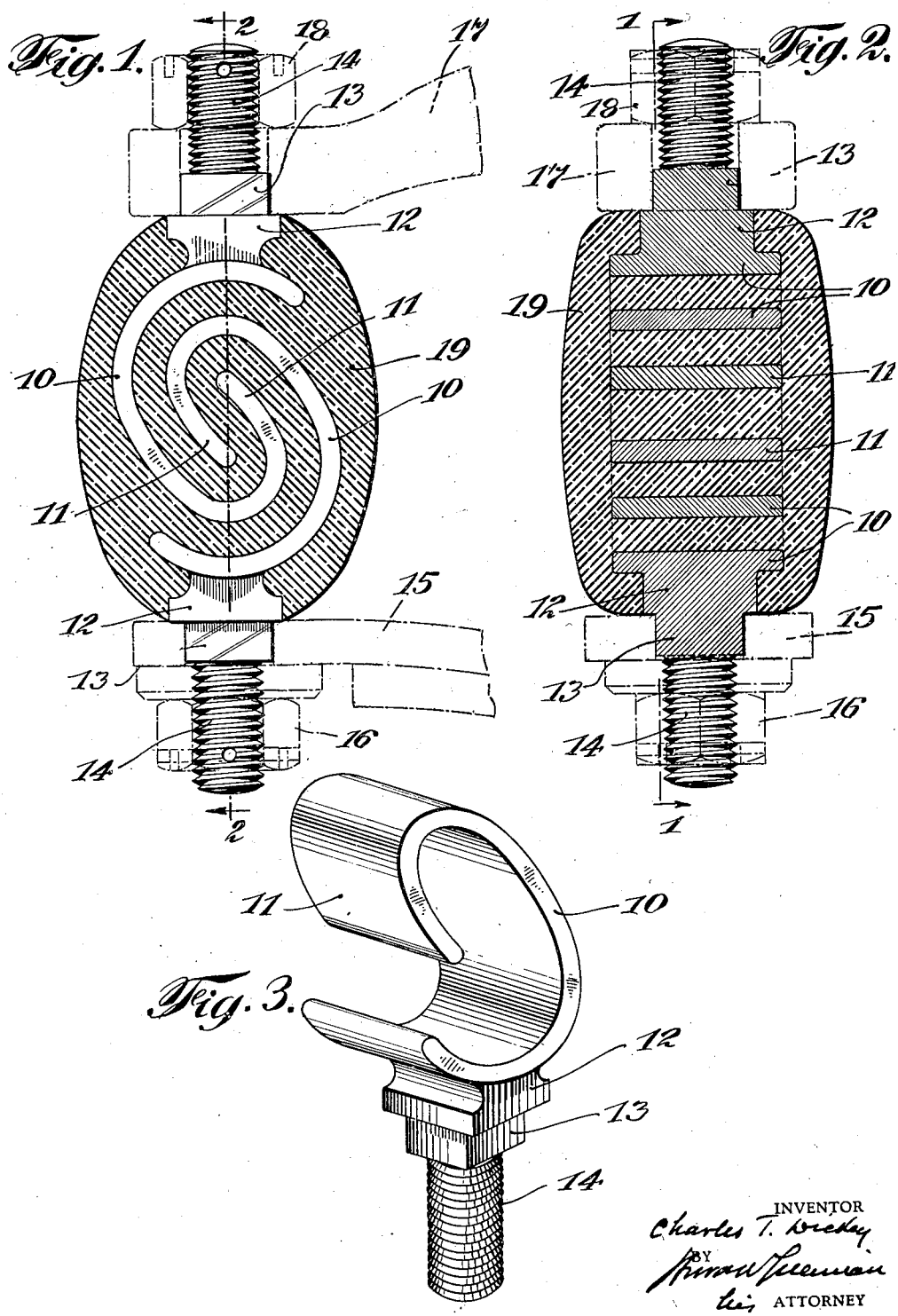

UNITED STATES PATENT OFFICE.

1,720,545

CHARLES T. DICKEY, OF ELIZABETH, NEW JERSEY, ASSIGNOR TO RODIC RUBBER COMPANY, OF GARWOOD, NEW JERSEY, A CORPORATION OF NEW JERSEY.

RESILIENT SHACKLE.

Application filed March 5, 1927. Serial No. 172,985.

My invention relates to shackles and refers particularly to shackles having rubber, or other resilient material, as a part thereof.

In vehicles, and especially in automobiles, it is desirable that means be employed to absorb, or materially reduce the vibrations incident to road inequalities and numerous devices have been suggested and adopted for this purpose, the greater portion of which are intended to control the spring movement of the vehicle.

It has been further suggested that resilient shackle means be employed in the connection between the springs and the body of the chassis and it is to this class of shock absorbing shackles that my invention belongs.

In order that a shackle of this character be properly operative it must be strong, impossible of separation due to sudden or strong separating forces, resilient to longitudinal thrusts, while side movement, or twists, are reduced to a minimum.

The device of my invention accomplishes all of the described, and other valuable purposes and comprises a pair of anchoring leaves, of a broken, or open, irregular link, or spiral form, so overlapped as to be inter-curved and impossible of separation from each other by a longitudinal stress, or pull. These anchor leaves are spaced from each other, the spaces being filled with rubber, or other resilient material, each leaf carrying an extended member capable of attachment to the vehicle chassis or the vehicle spring.

It is evident, therefore, that any longitudinal expansion or compression of the leaves with respect to each other will be met by resilient resistance, and that any great side movement of the leaves is impossible.

In the accompanying drawings illustrating one form of the device of my invention similar parts are designated by similar numerals.

Figure 1 is a longitudinal cross-section taken through the line 1—1 of Figure 2.

Figure 2 is a longitudinal cross-section taken through the line 2—2 of Figure 1.

Figure 3 is a perspective view of one of the anchor leaves shown in the other figures.

The particular form of the device of my invention shown in the accompanying drawings comprises a pair of anchor leaves. Each anchor leaf has an open curved element of flat material 10. These anchor leaves are so constructed that when incorporated in my device, the free end portions 11, 11 will overlap each other.

Fixedly attached to, or integral with, each anchor, is an abutment 12 extended into the stud 13, which in turn is extended into, or carries, the threaded bolt 14.

In my device, the two anchors are placed in spaced reversed position with respect to each other, as shown in Figures 1 and 2, and the spaces thus formed are occupied by rubber 19, preferably cemented, or fixedly attached, to the anchor leaves.

In the employment of my shackle, stud 13 is passed through a corresponding opening in a spring 15 and retained therein by means of the nut 16 threaded upon the member 14. The other stud 13 is passed through a corresponding opening in a chassis element 17 and retained therein by means of the nut 18 threaded upon the member 14.

The body of my shackle, therefore, comprises two inter-curved anchor leaves spaced from each other and within a resilient mass, as rubber, having extended portions capable of attachment to a fixed portion of chassis and to a spring.

In the operation of my device, a longitudinal thrust will be compensated by the rubber cushion between the two anchors, thus absorbing any sudden longitudinal shock, while a side thrust is likewise absorbed by the rubber cushion.

I do not limit myself to the particular size, shape, number, arrangement or material of parts as shown and described, as these are given simply for the purposes of clearly explaining the device of my invention.

What I claim is:—

1. In a resilient shackle, in combination, two over-lapping anchor leaves spaced from each other, each anchor having an extended fastening means and a resilient material between the anchor leaves.

2. In a resilient shackle, in combination, a resilient mass, two spaced interlocked anchor leaves within the resilient mass and a fastening member carried by each anchor leaf extending outwardly of the resilient mass.

3. In a resilient shackle, in combination, a rubber mass, two spaced curved interlocked anchor leaves within the rubber mass, a fastening member carried by each anchor leaf extending outwardly of the rubber mass and means carried by the fastening means allowing their attachment to a chassis and a leaf spring.

4. In a resilient shackle, in combination, a rubber mass, two spaced curved interlocked anchor leaves within the rubber mass and fixedly attached to the rubber mass, a fastening member carried by each anchor leaf extending outwardly of the rubber mass and means carried by the fastening means allowing their attachment to a chassis and a leaf spring.

5. In a resilient shackle, in combination, a rubber mass, two spaced curved interlocking anchor leaves within the rubber mass, an abutment carried by each leaf within the rubber mass, and a fastening means carried by each abutment extending outwardly of the rubber mass.

6. In a resilient shackle, in combination, a rubber mass, two spaced curved interlocked anchor leaves within the rubber mass and fixedly attached to the rubber mass, an abutment carried by each leaf within the rubber mass and fixedly attached to the rubber mass and a fastening means carried by each abutment extending outwardly of the rubber mass.

7. In a resilient shackle, in combination, a rubber mass, two spaced spiral-like interlocked anchor leaves within the rubber mass, a fastening means carried by each anchor leaf extending outwardly of the rubber mass and means carried by the fastening means allowing their attachment to a chassis and a leaf spring.

8. In resilient shackle, in combination, a rubber mass, two curved spaced anchor leaves within the mass, so positioned with respect to each other to prevent their longitudinal separation and a fastening means carried by each leaf extending outwardly of the mass.

9. In a resilient shackle, in combination, a resilient mass, two spaced interlocked anchor leaves of flat material within the resilient mass and a fastening member carried by each anchor leaf extending outwardly of the resilient mass.

10. In a resilient shackle, in combination, a rubber mass, two spaced curved interlocked anchor leaves of flat material within the rubber mass, an abutment carried by each leaf within the rubber mass and a fastening means carried by each abutment extending outwardly of the rubber mass.

11. In a resilient shackle, in combination, a rubber mass, two spaced spiral interlocked anchor leaves of flat material within the rubber mass, a fastening means carried by each anchor leaf extending outwardly of the rubber mass and means carried by the fastening means allowing their attachment to a chassis and a spring leaf.

12. In a resilient shackle, in combination, a rubber mass, two curved anchor leaves of flat material spaced from each other within the rubber mass, fastening means carried by each leaf and extending beyond the rubber mass and the said leaves being so positioned with respect to each other as to be locked from disengagement longitudinally of the fastening means.

13. A combined insulating and vibration-dampening device for connecting relatively movable parts, comprising a member adapted to be secured to one of said parts, a member adapted to be secured to another part, and vibration-dampening material joining and embedding said members, the latter being arranged to interlock in spaced relation, said material forming an insulation between the interlocking portions.

14. A combined insulating and vibration-dampening device for connecting relatively movable parts, comprising a member adapted to be secured to one of said parts, a member adapted to be secured to another part, said members including interlocking portions embedded in vibration-dampening insulating material and being movable in all directions while maintaining the interlock.

15. A combined insulating and vibration-dampening device for connecting relatively movable parts, comprising a member adapted to be secured to one of said parts, a member adapted to be secured to another part, said members including substantially C-shaped portions adapted to interlock in spaced relation, and vibration-dampening insulating material arranged to fill the spaces between the interlocking portions and join said members together.

Signed at Garwood, in the county of Union and State of New Jersey, this 2nd day of March, 1927.

CHARLES T. DICKEY.